United States Patent
Roberts (10) Patent No.: US 10,210,719 B1
(45) Date of Patent: Feb. 19, 2019

(54) AUTOMATED GEOSPATIAL SECURITY ALARM ROUTING

(71) Applicant: SureView Systems, LLC, Tampa, FL (US)

(72) Inventor: Paul Roberts, St. Petersburg, FL (US)

(73) Assignee: Sureview Systems, LLC, Tampa, FL (US)

( * ) Notice: Subject to any disclaimer, the term of this patent is extended or adjusted under 35 U.S.C. 154(b) by 0 days.

(21) Appl. No.: 15/623,480

(22) Filed: Jun. 15, 2017

(51) Int. Cl.
G08B 27/00 (2006.01)
G08B 3/10 (2006.01)
H04W 4/04 (2009.01)
G06Q 10/04 (2012.01)

(52) U.S. Cl.
CPC ......... *G08B 3/1083* (2013.01); *G06Q 10/047* (2013.01); *G08B 27/001* (2013.01); *H04W 4/04* (2013.01)

(58) Field of Classification Search
None
See application file for complete search history.

(56) References Cited

U.S. PATENT DOCUMENTS 7,839,289 B2 * 11/2010 Chung .................. G01S 5/0018
340/10.4
2017/0321923 A1 * 11/2017 Wiens-Kind ......... F24F 11/0086

* cited by examiner

*Primary Examiner* — K. Wong
(74) *Attorney, Agent, or Firm* — Nicholas Pfeifer; Smith & Hopen, P.A.

(57) ABSTRACT

A security-monitoring platform adapted to automatically handle and route security alerts to security personnel through personnel assistant devices. The personnel assistant devices preferably include location and availability information that can be conveyed to the security-monitoring platform. The system and method includes analyzing location information for the security alert source with respect to the availability and location information for each personnel assistant device to identify one or more security guards that can handle the security alert. The system is able to automatically perform these tasks without having to first be routed through a queue for analysis from a security-monitoring platform operator. As a result, the system and method overcomes this major issue in the industry of delayed processing of security alerts and is able to more efficiently and effectively process a plurality of security alerts simultaneously.

20 Claims, 6 Drawing Sheets

(Prior Art)

AUTOMATED GEOSPATIAL SECURITY ALARM ROUTING

BACKGROUND OF THE INVENTION

1. Field of the Invention

This invention relates, generally, to a security-monitoring system. More specifically, it relates to a security-monitoring platform configured to automatically identify and analyze a security alert and then automatically route the security alert to one or more security guards based on real-time location and movement information.

2. Brief Description of the Prior Art

Effectively securing an asset or facility typically requires numerous and various types of security systems. Ideally, all of the security systems protecting the object or facility are monitored and controlled by a single security-monitoring platform (SMP). An SMP is designed to integrate these disparate security systems by aggregating the system-specific information into a single interface. Effectively, the SMP provides operator(s) with an enhanced level of situational awareness when responding to security alerts.

Security systems include, but are not limited to, video systems, door access control systems to control who can access the location or areas within, intrusion detection systems to detect intruders (for example motion detection sensors or thermal detection sensors), audio systems to provide one-way or two-way audio communications, lone worker GPS-enabled devices with a panic button for guards, and situational awareness systems to provide information outside of traditional alarm sources, such as earthquake and weather warnings. Each security system usually contains several types of security monitoring assets. A security monitoring asset includes, but is not limited to, any alarm source, video source, output, security personnel, or audio source used to secure an object, facility, or person. Each security monitoring asset provides different operational capabilities, including but not limited to:

- Security Alert Sources: when triggered raise an alert (such as a door or window being forced open or a motion sensor being triggered) to the SMP operator, which the operator must process. The security alerts can also include location information if the security alert source is moving, such as a vehicle moving outside of a geofence or a mobile guard who has raised an SOS alarm.
- Cameras: allow the operator to view what is happening at a location.
- Audio Inputs and Outputs: allow the operator to hear what is happening at the location and also transmit sound to the location, respectively (e.g. intercoms to verify someone's identity and then let them in, and public address systems to transmit a warning and scare off a potential intruder).
- Outputs and Doors: allow the operator to control various systems (e.g. opening gates, turning on lights, granting access to doors).
- Security Personnel: the operator can directly contact personnel via a communication systems integrated with the SMP to either warn them of the security event or have them participate in the processing of the event as a local resource.

Typically, the various security systems by themselves lack the necessary hardware and software to interact with other security systems. For that reason, SMPs are designed to integrate several security systems into a single, more easily managed platform. Each security system includes a system-specific application programming interface (API). The API for each security system is unique to that security system, but each API provides the necessary communicability to enable a user to control and utilize the security system. For example, an API can create (1) a connection to web services inside the security system allowing a user to execute commands to query and control the security system's security monitoring assets, (2) a connection to the data store of the security system, and/or (3) a proprietary connection through a software development kit (SDK) with functions allowing a user to query and control the security system's security monitoring assets.

Moreover, some APIs are configured to send regular "heartbeat" messages that inform the SMP if a particular security monitoring asset is no longer available/operating. Furthermore, an API provides a means to seamlessly update an SMP's catalogue of a security system's security monitoring assets. When a security monitoring asset is removed or added to a security system, the security system's API communicates that update to the SMP. In other words, traditional systems run all of the information from these disparate security systems through the SMP at which time an operator will analyze the situation and organize a response.

Figure 1:
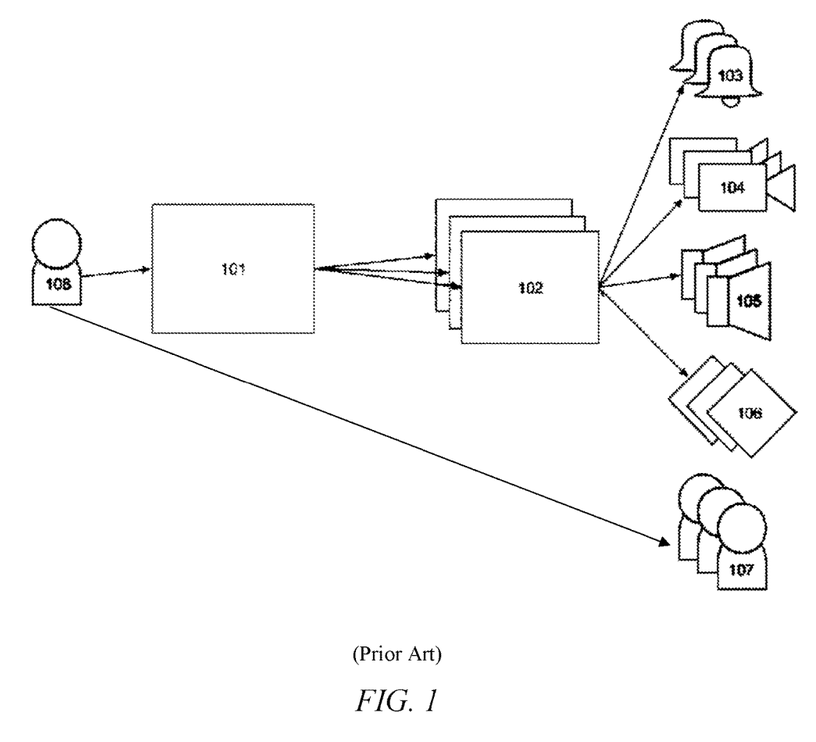
FIG. 1 is a schematic diagram illustrating the typical communication structure of a security-monitoring platform.

This traditional system is illustrated in FIG. 1. Security systems 102, and in turn their respective security monitoring assets 103-106, are in communication with a conventional SMP 101 using the security system's manufacturer's API. Once connected, SMP operator 108 is capable of interacting with a particular security monitoring asset 103-106 (e.g. receive alarms from the alarm devices 103, view live video from camera devices 104, transmit/receive audio from audio devices 105, and control the outputs of output devices 106). In addition, SMP operator 108 can communicate with security personnel 107. FIG. 1 provides a simplified illustration of SMP 101 communicating with only a few security systems 102, however, SMPs are intended to operate with numerous security systems to provide a fully integrated platform.

Currently, when a security alert is triggered, a notice of the alert it is immediately added to a queue in the SMP and waits to be processed by the next available operator. The operator(s) are usually situated at a central location such as a remote security center and it is their job to process the security alerts and handle them appropriately. Because operator(s) cannot leave their positions they often require help from local security personnel. The security personnel can go to the source of the event and assist the operator(s) by e.g. providing additional information about the situation and performing any manual actions, such as apprehending an intruder, closing a propped-open door, assisting staff with an issue, or providing CPR to an injured person.

The current technology's reliance on SMP operators in conjunction with security personnel has the following issues:

- Because of the usually vast number of security systems monitored by an SMP, it is not uncommon for all operators to be busy, resulting in new security alerts piling up in the queue waiting to be processed. Major issues occur when the security alerts are time sensitive, such as fires or panic alarms, and they remain in the queue for an extended period of time. These situations arise because the operators are a bottleneck. Operators are constantly receiving a plurality of security alerts of varying types from many different locations and can only process one at a time.

If the operator requires any additional information about the situation or if he/she needs a physical presence at the location of the security alert, then the operator must contact the nearest available security personnel to get assistance. Unfortunately, the operator has to put out a broadcast (usually via radio) to all personnel at the location because (1) the operator does not know which personnel are available or busy handling other things and (2) the operator does not know which security personnel is nearest to the event. This communication lag increases the duration of the event and prevents the operator from picking up the next waiting event in the queue. Ultimately, this compounds the issue first issues described above.

Often the method of communication between the operators and security personnel, e.g. radio, telephone, etc., is external to the SMP, which means that the conversations will not be a part of the event's audit trail. Thus, there is no evidence of the communications or the content of the communications when reviewing the event afterwards.

Ultimately, the current state of the art is flawed because of the reliance on human interaction to coordinate security personnel with a particular security alert. This reliance is subject to human error and produces slower response times, which can have a significant negative impact in the security industry.

Accordingly, what is needed is a system and method to automatically notify security personnel when a security alert is triggered thereby avoiding unnecessary delays typically associated with waiting for an SMP operator to address the security alert and contact security personnel to handle the security alert. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant(s) in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method to reduce the time and effort needed to process security alerts is now met by a new, useful, and nonobvious invention.

The novel invention includes a system and method for automatically analyzing security alerts and requesting security personnel to handle the security alert without first having to send the security alert to SMP operator's queue and wait for the SMP operator to address the alert and then communicate with security personnel. The novel method is typically triggered when a security alert is received by a security monitoring platform (SMP). Subsequently, the system identifies the source of the security alert and retrieves location-based information from the source or from a data store having location information stored therein. The location-based information may be exchanged between the SMP and the security alert source through an application programming interface. The location-based information originates from location-based technology integrated into or included on the security alert source, or may originate from a data store in which location-based information has been previously stored. In an embodiment, location-based information may be determined and stored in a data store if the security alert source is static (not moving) and/or does not include location-based technology.

The system then analyzes location-based information from each personnel assistant device (PAD). The location-based information may be exchanged between the SMP and the PAD through any location-based technology integrated into or included on the PAD. In an embodiment, the system also analyzes availability information for each PAD. The availability information is adapted to convey whether a particular security guard handling a particular PAD is available to investigate the security alert.

Once the availability and location-based information for the PAD is retrieved, the system evaluates the retrieved location-based information for the PADs that are available with respect to the location-based information for the security alert source. One or more preferred PADs are selected based on the evaluation and the system automatically sends requests to said PADs to investigate the security alert. The system is thereby able to avoid any time delays resulting from a notification of the security alert residing in a queue waiting for a SMP operator to process the security alert.

An embodiment includes the step of determining if any of the requests to investigate the security alert were accepted by one or more PADs. In response to a determination that the request was not accepted by any of the PADs, the system determines if there are any available PADs that have not previously rejected the request to investigate the security alert. If there are available PADs that have not previously rejected the request to investigate the security alert, the system restarts at the step of retrieving location-based information for a plurality of PADs.

An embodiment also includes the step of accessing a data store and determining a number of security guards required to investigate the security alert. Such an embodiment will loop through the steps of retrieving location-based information for a plurality of PADs, evaluating the retrieved location-based information for the PADs with respect to the location-based information for the security alert source, and automatically sending requests to one or more PADs, based on the location-based information of the one or more PADs with respect to the location-based information of the security alert source, until the required number of security guards equates to a number of acceptances from the PADs.

The novel security monitoring system includes an SMP in communication with one or more PADs and one or more security systems. The SMP is configured to communicate with one or more security systems through application programming interfaces (APIs), with each security system having one or more security monitoring assets (SMAs).

The PADs are intended to reside with mobile security personnel, and include location-based technology that can communicate location-based information to the SMP and an availability monitoring switch in wireless communication with the SMP. The availability monitoring switch has a first setting that informs the SMP that a security guard handling the PAD is available and a second setting that informs the SMP that the security guard handling the PAD is unavailable.

The system also includes an evaluation program adapted to evaluate the location based-information for a SMA that relays a security alert to the SMP with respect to the location based-information and the availability monitoring switch of the PAD to determine if the SMP should automatically send notice of the security alert to the PAD.

In an embodiment, the PAD is configured to communicate with one or more security systems through APIs.

In an embodiment, the location-based technology includes at least one from the group consisting of GPS, compass, altimeter, gyroscope, RFID system, and accelerometer.

In an embodiment, SMAs include at least one from the group consisting alarm sources, video sources, outputs, audio sources, and situational awareness systems.

In an embodiment, the PADs include an electronic display screen to present an operator of the PAD with visual information to adequately process the security alert. In an embodiment the SMP includes an electronic display screen to present an operator of the SMP with visual information to adequately process the security alert.

An object of the invention is to provide an SMP that is constantly evaluating location and availability data for PADs and automatically routing unprocessed events to any security personnel that meet the rule requirements.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a system and method for improving the efficiency and efficacy of the security monitoring industry by eliminating the bottlenecking associated with the requirement that a security-monitoring platform (SMP) operator receive and analyze a security alert before instructing security personnel how, where, and when to take action. As depicted in FIG. 1, the current state of the art requires operator(s) 108 to analyze and process individual security alerts (often in chronological order) before security personnel 107 are contacted for assistance. In addition, operators 108 must engage in several communication relays to determine if security personnel 107 are present and which security personnel 107 are available to address the security alert in the field.

The present invention is able to improve upon these pitfalls of the security monitoring industry through a novel system and method for analyzing security alerts and automatically coordinating with security personnel using personnel assistant devices (PADs) in wireless communication with the SMP. As will be explained in more detail, the SMP automatically routes security alert information received from security monitoring assets (SMAs) to the nearest available security personnel through the evaluation of the security personnel information retrieved from the PADs. In other words, the present invention improves upon SMP technology by bypassing the alert queue and operator analysis to increase the speed and efficacy of the SMP.

Figure 2:
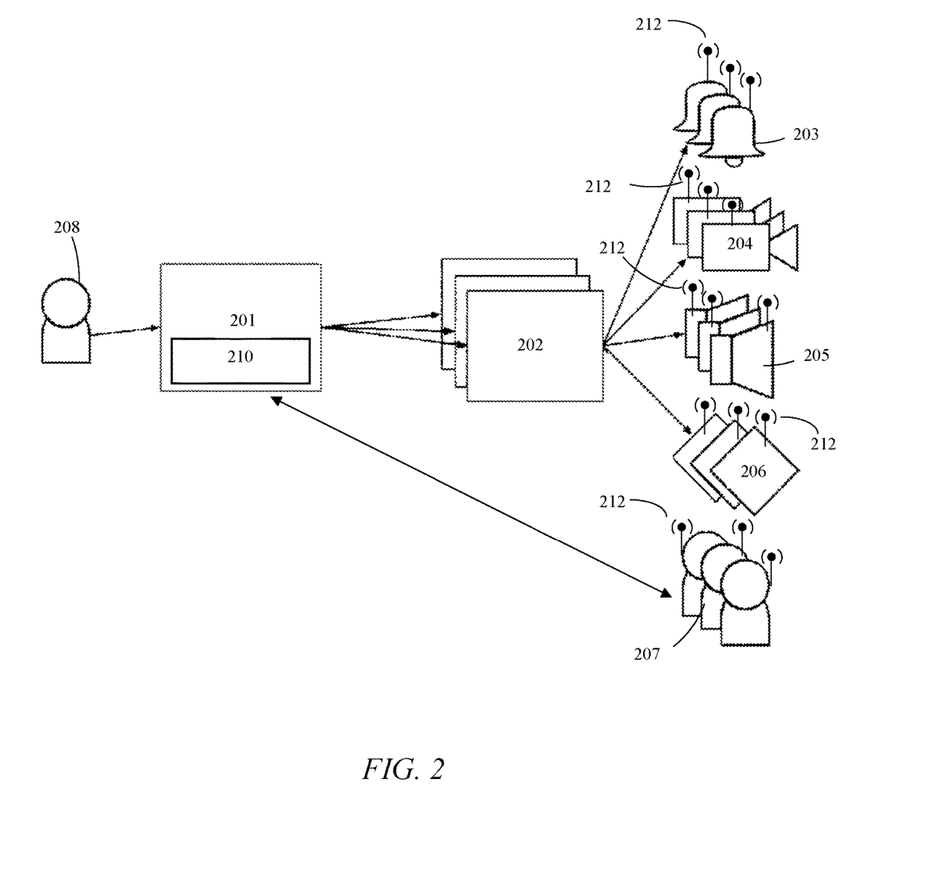
FIG. 2 is a schematic diagram illustrating the improvements of the present invention.

SMAs include, but are not limited to, any alarm source 203, video source 204, audio source 205, output 206, and vehicle (not shown) used to aid in monitoring an object, facility, or person (collectively referred to herein as "objects of interest" or "OI" for short). It should be noted that security personnel may include emergency response personnel, police officers, firefighters, and other individuals serving the public.

A security alert is any alert provided from one of the SMAs or security personnel, not just threats or alarms. For example, access control systems monitor and control nearly every aspect of a door. Therefore, a non-threatening alert could include, e.g., a valid card swipe, while a threatening alert could include, e.g., a forceful entry. Non-threatening alerts are monitored because an operator may want to keep a record of non-threatening activities, such as visual records confirming the identity of persons executing a valid card swipe.

In an embodiment, each of the SMAs, mobile and static assets, contains location-based technology configured to exchange location-based information with the SMP. As a result, the SMP can pinpoint the location and movement of the source of a security alert when a security alert is triggered, and present the SMP operator or security personnel with the most relevant information to properly address the security alert. Location based-technology may include, but is not limited to, a GPS, compass, altimeter, gyroscope, RFID tags, and accelerometer. The technology may be integrated into the SMAs or be attach as an aftermarket modification. In an embodiment, only the mobile SMAs include location-based technology and the static SMAs may have location-based information stored in a data store. In an embodiment, only the PADs include location-based technology.

Referring to FIG. 2, a simplified exemplary illustration of an embodiment of the present invention includes SMP 201 in communication with security systems 202, and in turn their respective SMAs 203-206. SMP 201 is also in communication with PADs 207. Once connected, SMP operator 208 is capable of interacting with a particular SMA 203-206 and PADs 207. Moreover, SMP 201 is also capable of automatically interacting with PADs 207 without input from SMP operator 208. Furthermore, PADs 207, and preferably also the SMAs 203-206, each include location-based technology 212, which is capable of providing location and/or movement information. As previously explained, an embodiment may include SMAs having location-based information stored in a data store accessible to SMP 201 and PDAs 207. Having location-based information in a data store in useful when one or more SMAs does not include location-based technology and in situations in which the SMA or the location-based technology is inoperable.

PADs 207 are also adapted to provide availability information to SMP 201 using, for example, a digital or manual toggle switch that can be moved between an "available" and an "unavailable" status with the capabilities of automatically sending updates on the availability information to SMP 201 when the availability changes or simply when scheduled based on a predetermined cycle. Availability updates may be sent to SMP 201 using any form of wireless communication known in the art. The availability information is preferably automatically and cyclically updated in the background. In addition, the availability information can be automatically changed to unavailable when a security guard accepts a request to process a security alert and can automatically switch back when the security alert is fully processed.

Moreover, an embodiment of PADs 207 preferably includes an integrated radio and/or telephone communication system. PADs 207 may also be configured to access security systems 202 and in turn their respective SMAs 303-306 either through SMP 201 or independent of SMP 201 through downloadable APIs. In an embodiment, PADs 207 may be equipped with navigation systems to guide security personnel directly to a triggered SMA.

The present invention further includes evaluation unit 210 in communication with and/or integrated with SMP 201. Evaluation unit 210 can be constantly operational or triggered upon the SMP's receipt of a security alert. When a security alert is triggered, evaluation unit 210 receives the security alert information and initiates a series of protocols to determine the best security guard to handle the security alert. In an embodiment, evaluation unit 201 then provides the selected security guard with access to security systems 202 and their respective SMAs 203-206 to aid the selected security guard in handling the security alert. An embodiment, may also automatically activate a navigation program on the security guard's PAD 207 to direct the security guard to the location of the security alert.

Figure 3:
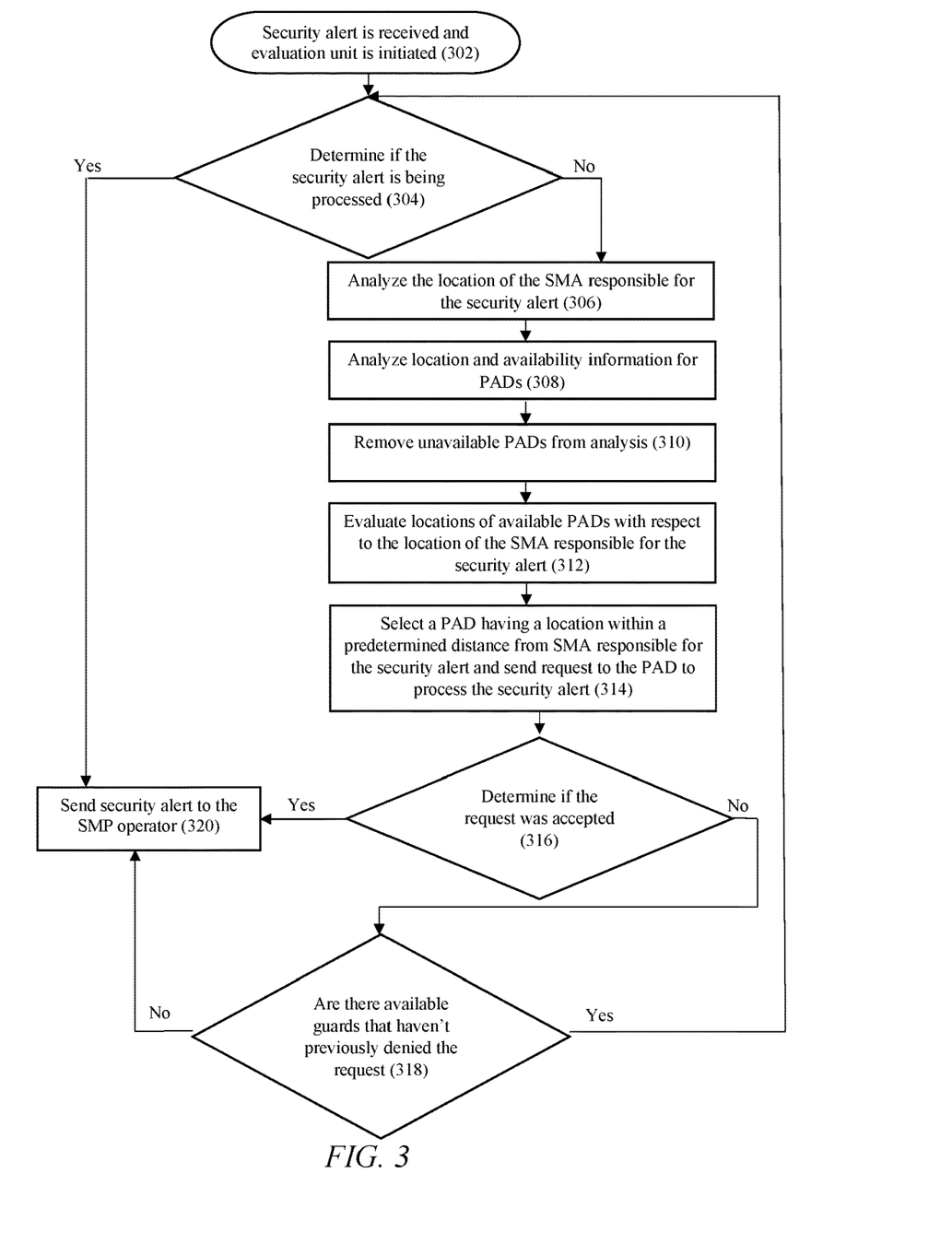
FIG. 3 is a flowchart of an embodiment of the present invention.

Referring now to FIG. 3, an embodiment of evaluation unit 210 performs the following series of protocols. A security alert is received and evaluation unit 210 is activated at step 302. It is then determined at step 304 whether the security alert is already being processed by an SMP operator 208, another evaluation unit from a second SMP working in conjunction with the current SMP 201, or a security guard. If the security alert is already being processed, the SMP operator is notified of the security alert at step 320. In an embodiment, the evaluation unit also ceases the evaluation of the security alert and waits for the next security alert.

If the security alert is not already being processed, the evaluation unit 210 determines the location of the SMA responsible for the security alert at step 306. In addition, evaluation unit 210 analyzes location information and availability information of PADs 207 at step 308. It should be noted that the order of step 306 with respect to step 308 is not critical and may be simultaneous or step 308 may occur prior to step 306.

At step 310, any PADs set to an unavailable status are removed from the subsequent analysis. In addition, an embodiment may also evaluate whether any PADs have already denied a request to handle this security alert and remove any PADs that have previously rejected the request from further analysis. The locations of the available PADs are then evaluated with respect to the location of the SMA responsible for the security alert at step 312. At step 314 a request is sent to the nearest PAD or a PAD within a predetermined distance from the SMA responsible for the security alert. If the security guard accepts the request on his/her respective PAD, at step 320, the SMP operator is notified of the security alert and notified of the particular security guard handling the event. In addition, the SMP operator is preferably provided with the necessary information to work with said security guard.

If the security guard denies the request on his/her respective PAD, the evaluation unit executes step 318 to determine if there are any available security guards that have not previously denied the request. If there are available security guards that have not previously denied the request, then the evaluation restarts at step 304. If there are no available security guards that have not previously denied the request, then, at step 320, the SMP operator is notified of the security alert and preferably informed of the measures taken to assign security personnel to handle the event.

It should be noted that the point at which the evaluation unit re-starts the protocol after step 318 can be at any point along the protocol, so long as the evaluation unit is able to send a request to another suitable PAD. In addition, the arrangement of the steps can be adjusted depending on the type of security systems in use. For example, FIG. 3 depicts the step of identifying the location of the SMA after the step of determining if the security alert is being processed in order to account for mobile SMAs. If the system employ only static/nonmoving SMAs, then determining the location of the SAM responsible for the security alert can be the first step after the evaluation protocol is initiated.

In an embodiment, the step of analyzing location and availability information for PADs may be a background action that is constantly being updated rather than an action resulting from a security alert.

In an embodiment, step 314—selecting a PAD within a predetermined distance from the SMA responsible for the security alert—may include several distance boundaries increasing in distance from the security alert source. The PADs within the closest boundary are considered prior to PADs located in the boundaries further from the security alert source. For example, the evaluation unit may automatically create digital distance boundaries centered around the security alert source similar to that of a target with zones extending outward from the bullseye. Each PAD in the nearest zone is requested to handle the event prior to proceeding to the PADs in the next closest zone.

In an embodiment, step 314—selecting a PAD within a predetermined distance from the SMA responsible for the security alert—may include an analysis of the PADs locations with respect to geofences. A geofence is a virtual barrier established in a software program, which typically relies on GPS coordinates or RFID systems to establish geographical boundaries. An embodiment may use geofences and PAD locations with respect to said geofences when determining the optimum security guard to handle the security alert. For example, PADs within a geofence (such as the internal perimeter of a building) may be considered more ideal than PADs outside of the geofence when the security alert source is located within the geofence/building. A guard's current distance from a security alert source may be closer, but less desirable because an exterior wall may be disposed between the guard and the source with the only entry to the building being located on the opposite side of the building.

It is also considered that the predetermined distance in step 314 may be adjustable through administrative access to the system and/or may be different based on the type of event. For example, the distance threshold from the security alert source may be greater when the security alert is a fire alarm than when the security alert arises from a propped-open door. The distance thresholds for each SMA are stored in a data store on, or accessible by, the SMP.

Figure 4:
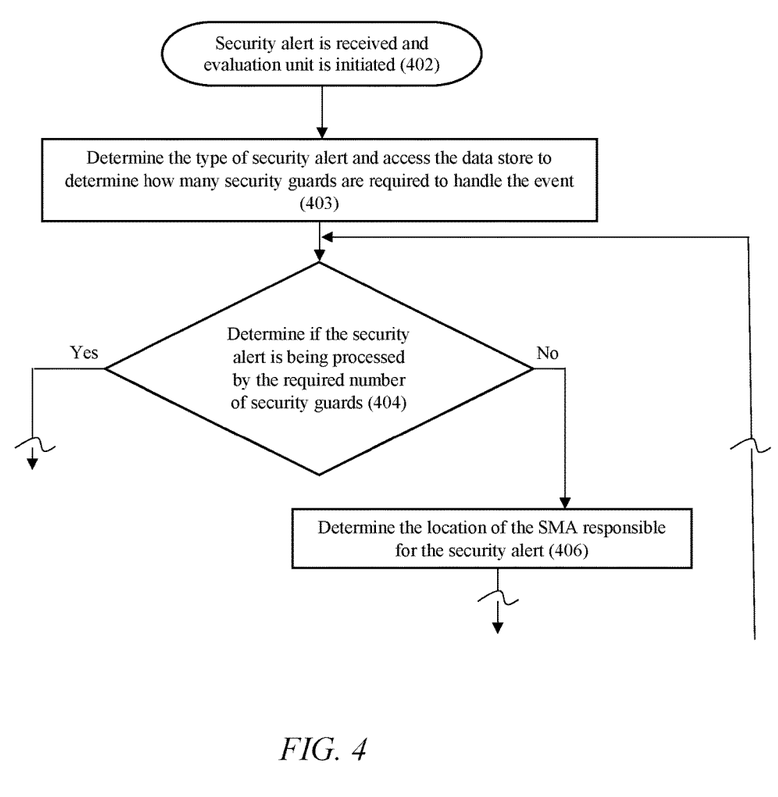
FIG. 4 is a partial flowchart of an embodiment of the present invention that can notify more than one security guard.

In an embodiment, as depicted in FIG. 4, different types of security alerts may require more than one security guard for handling the event. Therefore, the evaluation unit 210 first analyzes the type of security alert and accesses a data store at step 403. The data store holds the programmable rules for the number of security guards required for each type of security alert. The evaluation unit then proceeds to step 404 and determines whether the security alert is being processed by the required number of security guards. If yes, the security alert is sent to the SMP operator at step 420. If the required number of security guards are not currently handling the security alert, the evaluation unit continues onto step 406 and continues in a similar manner as depicted in FIG. 3.

Figure 5:
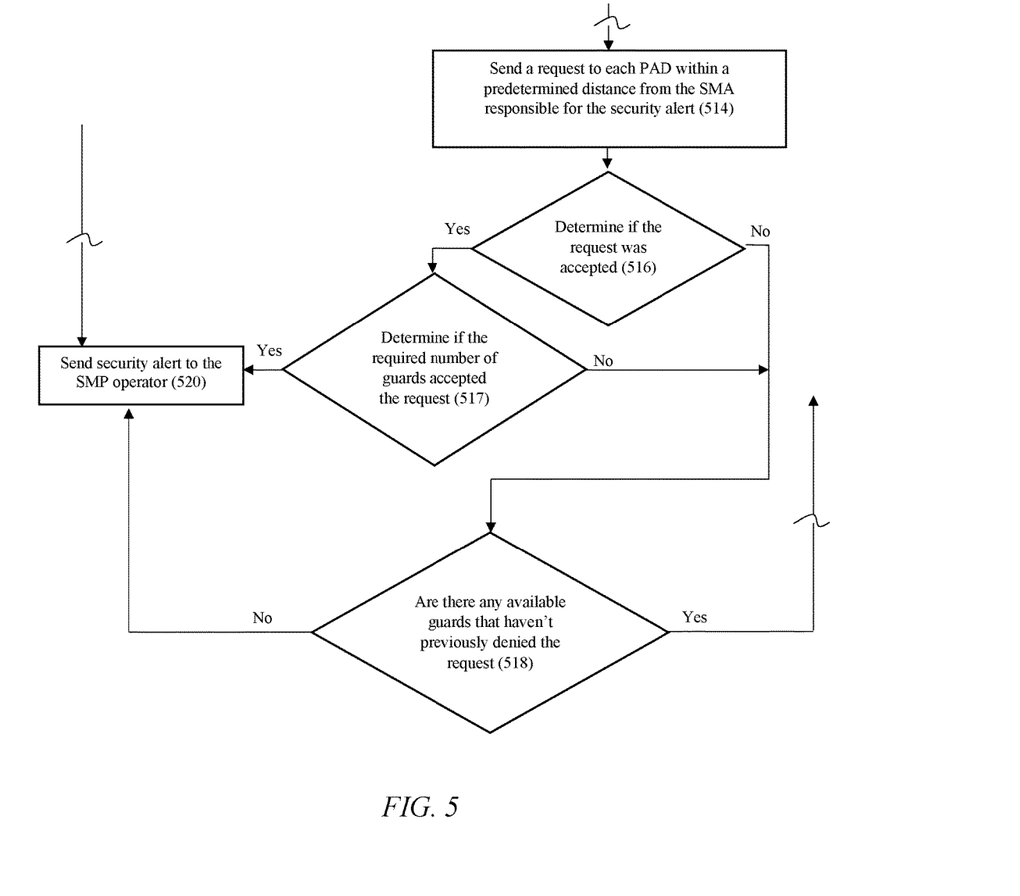
FIG. 5 is a partial flowchart of an embodiment of the present invention that can notify more than one security guard.

In an embodiment as depicted in FIG. 5, step 314 (step 516 in FIG. 5) includes sending a request to every PAD located within a predetermined distance from the SMA to expedite the response time. At step 516 the evaluation unit determines if the request was accepted. If none of the guards accept the request or less than the required number of guards accept the request, the evaluation unit proceed to step 518 to determine if there are any other guards that haven't previously denied the request. If the request was accepted, the evaluation unit determines if the required number of guards have accepted the request at step 517. If it is determined that the required number of guards have accepted the request, the security alert is sent to the SMP operator, preferably with information notifying the SMP operator of the security guards handling the event, at step 520. In an embodiment, any requests still pending are terminated when it is determined that the required number of guards have accepted the request.

Figure 6:
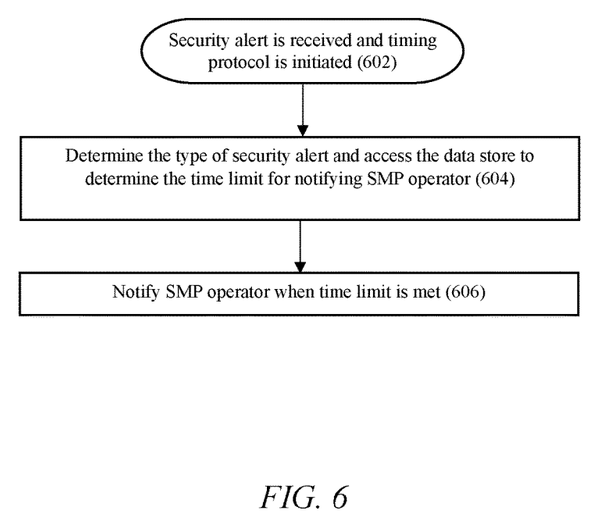
FIG. 6 is a flowchart of an embodiment of the present invention having a timing protocol.

As depicted in FIG. 6, an embodiment includes a timing protocol configured to keep track of the time that has passed since the security alert was triggered. The timing protocol is initiated when the security alert is received at step 602. Then at step 604, the security alert is analyzed and a data store is accessed to determine the time limit for notifying the SMP operator. Finally, at step 606, the SMP operator is notified of the security alert if the security alert is not assigned to a security guard and/or processed by the determined time limit. The time limit may vary depending on the type of security alert. For example, a security alert resulting from a door being propped open might have a one-minute time limit, whereas the triggering of a panic alarm may immediate trigger a notification to the SMP operator.

An embodiment may include an additional initial step of verifying if the particular security alert requires that an operator be initially or simultaneously notified of the security alert. The operator may be notified instead of processing the security alert through the automated evaluation unit or may be notified in addition to the automated processing. Whether an operator should be notified is a setting in the SMP or evaluation unit that can be adjusted for any security type of alert and is preferably password protected to avoid non-administrative individuals from altering the settings.

In an embodiment, all of the actions performed by the evaluation unit and the information for each PAD, e.g. the location and communication information, is compiled and stored in an archive data store for future audits of the system and security personnel.

In an embodiment, the distance parameter limits may be different for each SMA/security alert source. As an example, a fire alarm triggering a security alert may have greater limits, due to the speed at which a fire can expand. While a door intercom may have narrower distance limits than those for the fire alarm due to static positioning of the intercom. Likewise, the distance limits for a mobile SMA may be greater than the distance limits for a static SMA due to mobility considerations. The distance limits are preferably preset limits, but an embodiment may include distance limits that are adjustable by the SMP operator and/or adjustable through an automated set of additional computer instructions.

The exchange of location-based information may occur periodically at predetermined time frames and/or may occur when a security alert is triggered. In an embodiment, the security alert source automatically sends its location-based information when it transmits a security alert. In an embodiment, a system incorporating a periodic exchange of location-based information may include a data store that keeps location-based information for the SMAs. In an embodiment, the stored location-based information is accessed to more quickly retrieve location-based information upon a triggering of a security alert. Further, a system may store location-based information to calculate the movement details of the SMAs using, for example, kinematic equations or the like.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Application Programming Interface: is a software intermediary that enables application programs to interact with each other and share data.

Data Store: is any hardware or software capable of storing information.

Encapsulate: is an action to alter a particular computer code to operate in conjunction with another system or program.

Location-Based Information: is information providing the location of something or someone.

Location-Based Parameter: is one or more measurable location and/or movement factors.

Security Alert: is any event that alters the status quo and is identifiable by a security system.

Security System: is any system providing security measures.

Security-Monitoring Platform: is a system in communication with one or more security systems designed to allow an operator to monitor and sometimes control the security system and its electronic security monitoring assets.

Security Monitoring Asset: is any monitoring object, including, but not limited to, alarm sources, video sources, outputs, audio sources, and situational awareness devices to provide information outside of traditional alarm sources, such as earthquake and weather warnings.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method for automatically notifying security personnel of a security alert comprising executing on a processor the steps of:
   receiving a security alert by a security monitoring platform;
   identifying a source of the security alert and receiving location-based information for the source of the security alert;
   retrieving location-based information for a plurality of personnel assistant devices by the security monitoring platform, wherein each personal assistant device is carried by one of the security personnel and the location-based information originating from location-based technology included on each personnel assistant device;
   evaluating the retrieved location-based information for the personnel assistant devices with respect to the location-based information for the security alert source;
   determining at least one of the security personnel that is in closest proximity to the security alert based on the location-based information of the personnel assistant devices; and
   automatically sending requests to at least one of the security personnel in closest proximity to the security alert through the personnel assistant devices to investigate the security alert.

2. The method of claim 1, further including the step of retrieving availability information for each personnel assistant device, the availability information adapted to convey whether a each security personnel handling each personnel assistant device is available to investigate the security alert.

3. The method of claim 2, further including the step of removing each personnel assistant device having an unavailable status from a list of personnel assistant devices to be evaluated in the step of evaluating the retrieved location-based information for the personnel assistant devices with respect to the location-based information for the security alert source.

4. The method of claim 1, further including the step of determining if any of the requests to investigate the security alert were accepted by the one or more personnel assistant devices.

5. The method of claim 4, further including, in response to a determination that the request was not accepted by any of the personnel assistant devices,
   determining if there are any available personnel assistant devices that have not previously rejected the request to investigate the security alert; and
   in response to determining that there are available personnel assistant devices that have not previously rejected the request to investigate the security alert, restarting at the step of retrieving location-based information for a plurality of personnel assistant devices by the security monitoring platform.

6. The method of claim 1, further including the step of accessing a data store and determining a number of security personnel required to investigate the security alert based on how the security alert is categorized as a type of security alert.

7. The method of claim 6, further including looping through the steps of retrieving location-based information for a plurality of personnel assistant devices by the security monitoring platform, evaluating the retrieved location-based information for the personnel assistant devices with respect to the location-based information for the security alert source, and automatically sending requests to one or more personnel assistant devices, based on the location-based information of the one or more personnel assistant devices with respect to the location-based information of the security alert source, to investigate the security alert, until it is determined that the required number of security personnel equates to a number of acceptances from the personnel assistant devices.

8. The method of claim 1, further including the step of sending location-based information for the security alert source to the one or more personnel assistant devices that were sent a request to investigate the security alert.

9. The method of claim 1, further including the step of accessing a timer data store and determining a time limit based on the security alert source, wherein the expiration of the time limit results in the security alert being sent to a security monitoring platform operator.

10. A computer-implemented method for automatically notifying security personnel of a security alert comprising executing on a processor the steps of:
   receiving a security alert by a security monitoring platform;
   identifying a source of the security alert and receiving location-based information for the source of the security alert through an application programming interface, the location-based information originating from location-based technology included on the security alert source;
   analyzing availability information for each personnel assistant device, the availability information adapted to convey whether a particular security guard handling a particular personnel assistant device is available to investigate the security alert;
   analyzing location-based information for a plurality of personnel assistant devices by the security monitoring platform, wherein the location-based information originates from location-based technology included on each personnel assistant device;
   evaluating the retrieved location-based information for the personnel assistant devices that are available with respect to the location-based information for the security alert source;
   automatically sending requests to one or more personnel assistant devices, based on the location-based information of the one or more personnel assistant devices with respect to the location-based information of the security alert source, to investigate the security alert; and
   whereby the method is able to avoid any time delays resulting from a notification of the security alert residing in a queue waiting for a security monitoring platform operator to process the security alert.

11. The method of claim 10, further including the step of determining if any of the requests to investigate the security alert were accepted by the one or more personnel assistant devices.

12. The method of claim 11, further including in response to a determination that the request was not accepted by any of the personnel assistant devices:
   determining if there are any available personnel assistant devices that have not previously rejected the request to investigate the security alert; and
   in response to determining that there are available personnel assistant devices that have not previously rejected the request to investigate the security alert, restarting at the step of retrieving location-based information for a plurality of personnel assistant devices by the security monitoring platform.

13. The method of claim 10, further including the step of accessing a data store and determining a number of security guards required to investigate the security alert.

14. The method of claim 13, further including the step of looping through the steps of retrieving location-based information for a plurality of personnel assistant devices by the security monitoring platform, evaluating the retrieved location-based information for the personnel assistant devices with respect to the location-based information for the security alert source, and automatically sending requests to one or more personnel assistant devices, based on the location-based information of the one or more personnel assistant devices with respect to the location-based information of the security alert source, to investigate the security alert, until the required number of security guards equates to a number of acceptances from the personnel assistant devices.

15. A security monitoring system, comprising:
   a security monitoring platform configured to communicate with one or more security systems through application programming interfaces;
   each security system having one or more security monitoring assets;
   a mobile personnel assistant device intended to reside with mobile security personnel, the personnel assistant device having:
      location-based technology that can communicate location-based information to the security monitoring platform; and
      an availability monitoring switch in wireless communication with the security monitoring platform, the availability monitoring switch having a first setting that informs the security monitoring platform that the security guard handling the personnel assistant device is available and a second setting that informs the security monitoring platform that the security guard handling the personnel assistant device is unavailable; and an evaluation program adapted to evaluate the location based-information for a security monitoring asset that relays a security alert to the security monitoring platform with respect to the location based-information and the availability monitoring switch of the personnel assistant device to determine if the security monitoring platform should automatically send notice of the security alert to the personnel assistant device.

16. The system of claim 15, further comprising the personnel assistant device configured to communicate with one or more security systems through application programming interfaces.

17. The security monitoring system of claim 15, wherein the location-based technology includes at least one from the group consisting of GPS, compass, altimeter, gyroscope, RFID system, and accelerometer.

18. The security monitoring system of claim 15, wherein security monitoring assets include at least one from the group consisting alarm sources, video sources, outputs, audio sources, and situational awareness systems.

19. The security monitoring system of claim 15, wherein the personnel assistant device includes an electronic display screen to present an operator of the personnel assistant device with visual information to adequately process the security alert.

20. The security monitoring system of claim 15, wherein the security monitoring platform includes an electronic display screen to present an operator of the security monitoring platform with visual information to adequately process the security alert.

* * * * *